March 21, 1961 P. R. CONTANT 2,976,088
END PLAY DEVICE FOR DYNAMOELECTRIC MACHINE
Filed Dec. 15, 1958
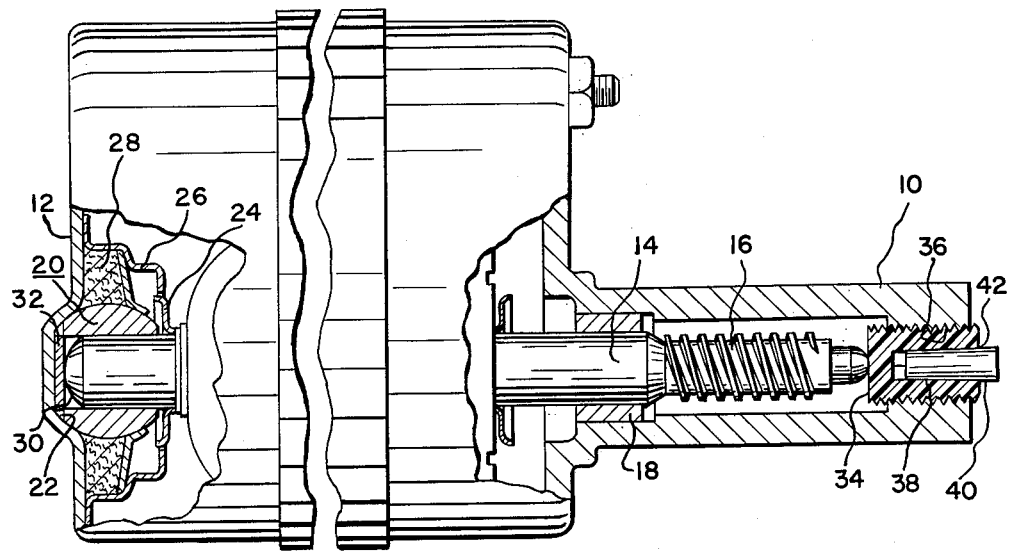
Fig. 1
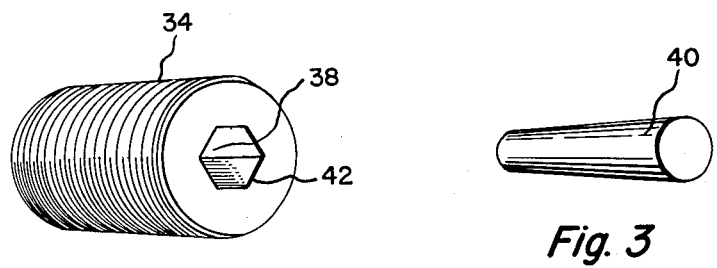
Fig. 2
Fig. 3
INVENTOR.
Peter R. Contant
BY
His Attorney ated Mar. 21, 1961

2,976,088

END PLAY DEVICE FOR DYNAMOELECTRIC MACHINE

Peter R. Contant, Rochester, N.Y., assignor to General Motors Corporation, Detroit, Mich., a corporation of Delaware Filed Dec. 15, 1958, Ser. No. 780,567

8 Claims. (Cl. 308—158)

This invention pertains to dynamoelectric machines, and particularly to a device for preventing end play of the shafts of dynamoelectric machines.

It is well recognized that excessive end play in the shafts of dynamoelectric machines is undesirable. Heretofore, numerous bearing assemblies have been devised for controlling or preventing end play in dynamoelectric machine shafts, but these prior bearing assemblies have not been used to any great extent due to their cost. The present invention relates to an exceedingly simple and economical thrust bearing assembly which can be adjusted to control the end play of a dynamoelectric machine shaft. Accordingly, among my objects are the provision of means for preventing end play in the shafts of dynamoelectric machines; the further provision of a self-lubricating and adjustable thrust bearing for dynamoelectric machines; and the still further provision of an end play adjustment device for dynamoelectric machines including an externally threaded stud of self-lubricating material which can be set and locked in precise position relative to the housing of the dynamoelectric machine.

The aforementioned and other objects are accomplished in the present invention by embodying a nylon stud as the end play adjustment device for a dynamoelectric machine. Specifically, the stud is composed of a linear polyamide capable of being extruded. The housing of the dynamoelectric machine is formed with an internally threaded opening adapted to receive the externally threaded nylon stud. The end of the stud is adapted to engage the partially spherical end of the shaft of the dynamoelectric machine.

The shaft of the dynamoelectric machine is rotatably supported by a pair of conventional radial bearings within the housing. The nylon stud is formed with a hole for receiving a tapered plug so as to lock the stud in adjusted position. The stud also has a tool receiving slot for rotating the stud to adjust the position relative to the housing, and if desired, the tool receiving slot may be integral with the hole for receiving the expanding plug. By reason of the fact that nylon is a self-lubricating material, the stud will not impose excessive friction on the shaft opposing rotation thereof.

Further objects and advantages of the present invention will be apparent from the following description, reference being had to the accompanying drawings, wherein a preferred embodiment of the present invention is clearly shown.

In the drawing:

Figure 1 is a fragmentary view, partly in section and partly in elevation, of the shaft of a dynamoelectric machine and the bearings therefor.

Figure 2 is a perspective view of the externally threaded stud.

Figure 3 is a perspective view of the tapered locking plug.

With particular reference to Figure 1, numeral 10 denotes a portion of the end cap in the housing of a dynamoelectric machine, a portion of the other end cap being denoted by the numeral 12. The dynamoelectric machine may be of the type disclosed in copending application Serial No. 664,009, filed June 6, 1957, in the name of Milton E. Simmons et al., and assigned to the assignee of this invention. Accordingly, a shaft 14 having an integral worm portion 16 is rotatably supported in the end caps 10 and 12 by bearing assemblies 18 and 20, respectively.

The bearing 18 comprises a conventional sleeve bearing, whereas the bearing 20 is of the self-aligning type, a portion of the spherical surface thereof being disposed within a depression 22 of the end cap 12. The end cap 12 has a slinger shield 24 attached thereto, which slinger shield supports a resilient bearing retainer 26. A felt packing 28, impregnated with lubricant, is interposed between the bearing retainer 26 and the end cap 12.

The left hand end of the shaft 14 is formed with a partially spherical end denoted by numeral 30, a porous metal disc 32, impregnated with oil, being disposed between the partially spherical end 30 of the shaft and the end cap 12. The other partially spherical end of the shaft 14 abuts the end of an adjustable thrust bearing indicated by the numeral 34.

As seen in Figure 1, the end cap 10 is formed with an internally threaded opening 36 for receiving the externally threaded bearing stud 34. The bearing stud 34 is composed of self-lubricating material, such as nylon. As seen in Figures 1 and 2, the stud 34 is formed with a centrally located hole 38 for receiving a tapered locking plug 40, as shown in Figure 3. The end portion 42 of the hole 38 may be formed as a hexagonal socket for receiving an "Allen" type wrench for rotating the stud 34 prior to locking it in position by forcing the plug 40 thereinto. However, if desired, the stud 34 may be formed with a conventional screw driver slot rather than the hexagonal socket.

After the end caps 10 and 12 have been assembled with a frame of the dynamoelectric machine, the end play device comprising the stud 34 is threaded into the tapped hole 36 to control the end play of the shaft 14. The amount of end play of the shaft 14 can be accurately controlled by adjusting the position of the stud 34 without disturbing the motor assembly. When the desired adjustment has been made, the tapered locking plug 40 is driven into the hole 38 thereby expanding the stud 34 to lock the plug 34 securely in position.

While the embodiment of the invention as herein disclosed constitutes a preferred form, it is to be understood that other forms might be adopted.

What is claimed is as follows:

1. An adjustable thrust bearing assembly including, a support having a threaded opening therein, a stud of self-lubricating plastic material threaded into said opening so as to be axially adjustable therein, the inner end of said stud engaging the partially spherical end of a shaft to control the end play of said shaft, and means for expanding said stud to effect locking thereof relative to said support.

2. An adjustable thrust bearing assembly including, a support having a threaded opening therein, a stud of self-lubricating plastic material threaded into said opening so as to be axially adjustable therein, the inner end of said stud engaging the end of a shaft rotatably journalled in said support, and means for expanding said stud to effect locking thereof relative to said support.

3. An adjustable thrust bearing assembly including, a support having a threaded opening therein, a nylon stud threaded into said opening so as to be axially adjustable therein, the inner end of said stud engaging the end of a shaft rotatably journalled in said support, and means for expanding said stud to effect locking thereof relative to said support.

4. An adjustable thrust bearing assembly including, a support having a threaded position therein, a nylon stud threaded into said opening so as to be axially adjustable therein, the inner end of said stud engaging the end of a shaft rotatably journalled in said support, said stud having a hole therein, and a tapered plug wedged in said hole to expand said stud and effect locking of said stud relative to said support.

5. In a dynamoelectric machine, a housing having an internally threaded opening, an externally threaded stud of self-lubricating plastic material threaded into said opening so as to be axially adjustable therein, a shaft rotatably journalled in said housing, the inner end of said stud engaging the end of said shaft to control the end play thereof, and means for expanding said stud to effect locking thereof relative to said housing.

6. In a dynamoelectric machine, a housing having an internally threaded opening, an externally threaded nylon stud threaded into said opening so as to be axially adjustable therein, a shaft rotatably journalled in said housing, the inner end of said stud being engageable with an end of said shaft to control the end play thereof, said stud having a hole therein, and a tapered plug insertable into said hole for expanding said stud to lock the stud relative to the housing.

7. The combination set forth in claim 6 wherein the outer end of said stud has a tool receiving opening therein.

8. In a dynamoelectric machine, a housing having an internally threaded opening, an externally threaded nylon stud threaded into said opening so as to be axially adjustable therein, a shaft rotatably journalled in said housing, the inner end of said stud being engageable with an end of said shaft to control the end play thereof, said stud having a hole therein with the outer portion formed as a noncircular wrench socket, and a tapered plug insertable into said hole for expanding said stud to lock the stud relative to the housing.

References Cited in the file of this patent

UNITED STATES PATENTS

| | | |
|---|---|---|
| 2,424,602 | De Swart | July 29, 1947 |
| 2,766,080 | Fineran | Oct. 9, 1956 |